(12) United States Patent
Beaman et al.

(10) Patent No.: US 10,712,920 B1
(45) Date of Patent: Jul. 14, 2020

(54) IN-BROWSER IMAGE PERSPECTIVE MANIPULATION

(71) Applicant: Shutterstock, Inc., New York, NY (US)

(72) Inventors: Roger Beaman, New York, NY (US); Andrea Bogazzi, Rome (IT)

(73) Assignee: Shutterstock, Inc., New York, NY (US)

( * ) Notice: Subject to any disclaimer, the term of this patent is extended or adjusted under 35 U.S.C. 154(b) by 160 days.

(21) Appl. No.: 15/898,180

(22) Filed: Feb. 15, 2018

(51) Int. Cl.
| G06F 3/0484 | (2013.01) |
| G06T 11/60 | (2006.01) |
| G06T 3/00 | (2006.01) |
| G06T 15/20 | (2011.01) |

(52) U.S. Cl.
CPC ........ *G06F 3/04845* (2013.01); *G06T 3/0006* (2013.01); *G06T 11/60* (2013.01); *G06T 15/20* (2013.01); *G06T 2200/24* (2013.01); *G06T 2210/12* (2013.01)

(58) Field of Classification Search
CPC ... G06F 3/04845; G06T 3/0006; G06T 11/60; G06T 15/20
See application file for complete search history.

(56) References Cited

U.S. PATENT DOCUMENTS

| 2012/0133779 | A1* | 5/2012 | Ma | G06K 9/6249 348/175 |
| 2012/0182318 | A1* | 7/2012 | Mansfield | G06T 3/00 345/643 |
| 2013/0063440 | A1* | 3/2013 | Son | G06T 15/005 345/426 |
| 2015/0193401 | A1* | 7/2015 | Kim | G06F 16/9577 715/234 |
| 2016/0292832 | A1* | 10/2016 | Bogan | G06T 3/0075 |
| 2017/0061693 | A1* | 3/2017 | Kohler | G06T 19/006 |
| 2018/0165854 | A1* | 6/2018 | Du | G06F 3/01 |

* cited by examiner

*Primary Examiner* — Angie Badawi
(74) *Attorney, Agent, or Firm* — McDermott Will & Emery LLP

(57) ABSTRACT

Methods for providing in-browser perspective manipulation are provided. In one aspect, a method includes executing, in a web browser, an image editing application retrieved from a remote server. The method also includes providing for display, in a user interface of the image editing application, a background and an image. The method also includes modifying anchors of the image in response to user input. The method also includes determining an indicator for supporting hardware graphics acceleration in the web browser. When the indicator is true, the method includes calling a 3D perspective transformation function on the image based on the modified anchors. When the indicator is false, the method includes a 2D approximation that divides the image into smaller units for affine transformations, which are then recombined into the transformed image. The method also includes compositing an output image comprising the transformed image in front of the background.

18 Claims, 6 Drawing Sheets

IN-BROWSER IMAGE PERSPECTIVE MANIPULATION

TECHNICAL FIELD

The present disclosure generally relates to image editing software adaptable to limited processing resources, and more specifically relates to in-browser image perspective manipulation.

BACKGROUND

Networked cloud applications and software as a service (SaaS) are quickly becoming the preferred methods to use productivity and business applications. Users can use both desktops and highly mobile devices to conveniently access applications over a network via a web browser. As a result, users can avoid many of the headaches associated with acquiring and maintaining locally installed applications. For example, users no longer need to locate malware free download locations, track software updates and licenses, perform disk backups, or upgrade hardware to meet changing application performance requirements.

The description provided in the background section should not be assumed to be prior art merely because it is mentioned in or associated with the background section. The background section may include information that describes one or more aspects of the subject technology.

SUMMARY

The disclosed system provides browser-based image compositing with perspective correction. A user may select an image for compositing into a background. To correct any difference in perspective between the image and the background, the system allows the user to move image anchors to adjust a perspective of the image. Based on detected browser capabilities, the system can utilize hardware accelerated 3D perspective transformations or fallback to a fast 2D approximation that provides a similar result with reduced computational effort. As a result, the system can provide in-browser perspective manipulation with faster computational time to support a wide range of hardware platforms, including highly mobile devices with limited processing capability.

According to certain aspects of the present disclosure, a computer-implemented method is provided. The method includes executing, in a web browser, an image editing application retrieved from a remote server. The method also includes providing for display, in a user interface of the image editing application, a background and an image, wherein the image includes a plurality of anchors. The method also includes modifying the plurality of anchors in response to user input. The method also includes determining an indicator for supporting hardware graphics acceleration in the web browser. When the indicator is true, the method includes calling a 3D perspective transformation function on the image using the modified plurality of anchors to provide a transformed image. When the indicator is false, the method includes dividing the image into a plurality of polygons, performing an affine transformation on each of the plurality of polygons based on the modified plurality of anchors, and combining the transformed plurality of polygons to provide the transformed image. The method also includes compositing an output image comprising the transformed image in front of the background.

According to certain aspects of the present disclosure, a system is provided including a memory, and a processor configured to execute instructions. When executed, the instructions cause the processor to execute, in a web browser, an image editing application retrieved from a remote server. The instructions also cause the processor to provide for display, in a user interface of the image editing application, a background and an image, wherein the image includes a plurality of anchors. The instructions also cause the processor to modify the plurality of anchors in response to user input. The instructions also cause the processor to determine an indicator for supporting hardware graphics acceleration in the web browser. When the indicator is true, the instructions cause the processor to call a 3D perspective transformation function on the image using the modified plurality of anchors to provide a transformed image. When the indicator is false, the instructions cause the processor to divide the image into a plurality of polygons, perform an affine transformation on each of the plurality of polygons based on the modified plurality of anchors, and combine the transformed plurality of polygons to provide the transformed image. The instructions also cause the processor to composite an output image comprising the transformed image in front of the background. The instructions also cause the processor to store the output image in the memory. The instructions also cause the processor to provide for display, in the user interface, the output image.

According to certain aspects of the present disclosure, a non-transitory machine-readable storage medium is provided that includes machine-readable instructions for causing a processor to execute a method. The method includes executing, in a web browser, an image editing application retrieved from a remote server. The method also includes providing for display, in a user interface of the image editing application, a background and an image, wherein the image includes a plurality of anchors comprising vertices of a bounding box for the image. The method also includes modifying the plurality of anchors in response to user input. The method also includes determining an indicator for supporting hardware graphics acceleration in the web browser. When the indicator is true, the method includes calling a 3D perspective transformation function on the image using the modified plurality of anchors to provide a transformed image. When the indicator is false, the method includes dividing the image into a plurality of triangles, performing an affine transformation on each of the plurality of triangles based on the modified plurality of anchors, and combining the transformed plurality of triangles to provide the transformed image. The method also includes compositing an output image comprising the transformed image in front of the background. The method also includes storing the output image in the memory. The method also includes providing for display, in the user interface, the output image.

According to certain aspects of the present disclosure, a system is provided. The system includes a means for executing, in a web browser, an image editing application retrieved from a remote server, providing for display, in a user interface of the image editing application, a background and an image, wherein the image includes a plurality of anchors, and modifying the plurality of anchors in response to user input. The system includes a means for determining an indicator for supporting hardware graphics acceleration in the web browser. The system includes a means for calling a 3D perspective transformation function on the image using the modified plurality of anchors to provide a transformed image when the indicator is true. The system includes a means for dividing the image into a plurality of polygons, performing an affine transformation on each of the plurality of polygons based on the modified plurality of anchors, and combining the transformed plurality of polygons to provide the transformed image when the indicator is false. The system includes a means for compositing an output image comprising the transformed image in front of the background.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

Figure 1:
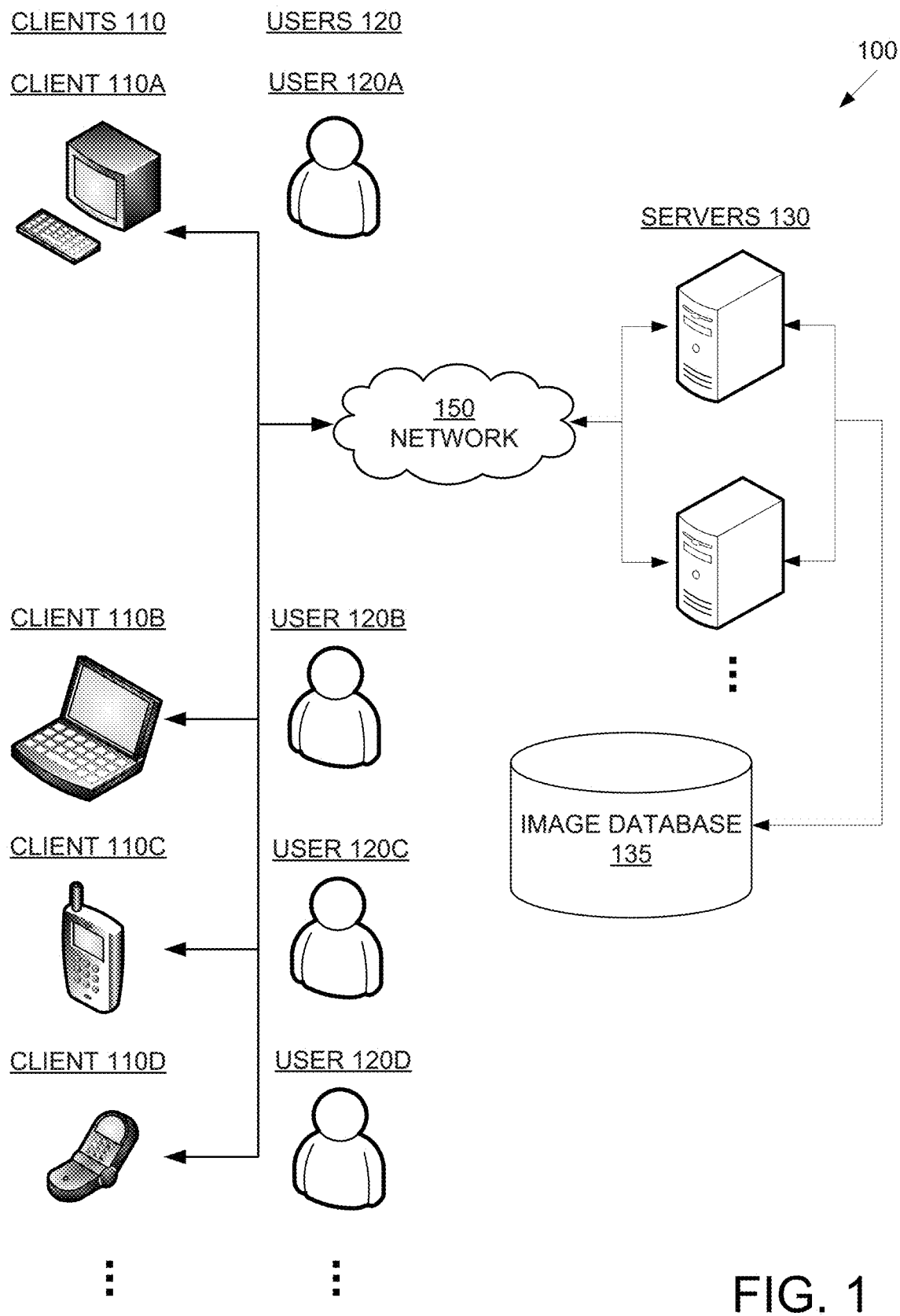
FIG. 1 illustrates an example architecture for in-browser image perspective manipulation.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

With the increased availability of cameras, touchscreens, pen tablets, document scanners, and other devices, it is easier than ever to capture or create images for social, creative, and business endeavors. Users can also integrate images available on the Internet for even more possibilities. For example, users may composite images by overlaying an image over a background image.

One issue that users may encounter is a mismatch in the camera angles or viewpoints of the source images to be composited. Unless the source images happen to have similar camera angles, compositing source images without any correction will provide a composite image that will be perceived as an obvious mishmash of different images. To provide a professional appearance with a consistent viewpoint, image perspective correction is needed.

While locally installed image editing software can provide image perspective correction, this approach may require significant hardware resources and financial commitment from the user. Users may prefer cloud based alternatives for ease of use, mobile accessibility, lower pricing, and other benefits. However, providing a cloud based solution raises its own challenges, such as the requirement to support various device environments and web browsers with different processing capabilities and feature support. Thus, there is a need for providing an image editing application that can provide image perspective correction while being adaptable and scalable for network usage.

The disclosed system provides browser based image compositing with perspective correction. To correct any difference in perspective between an image and a background to be composited, the system allows the user to move image anchors to adjust a perspective of the image. Based on detected browser capabilities, the system can utilize hardware accelerated 3D perspective transformations or fallback to a fast 2D approximation, which may divide the image into smaller work units for fast affine transformations.

The disclosed system addresses a technical problem tied to computer technology and arising in the realm of computer networks, namely the technical problem of providing perspective manipulation within a web browser that adapts to various browser and device environments. By providing a transformation algorithm that can utilize 3D accelerated hardware transformations or quick 2D approximations, the disclosed in-browser perspective manipulation provides improved computation time to enable a browser-based image editing interface that can perform comparably to a desktop image editing application. The scalability of the transformation algorithm enables a wide range of hardware platforms to be supported, including highly mobile devices with limited processing capability.

Example System Architecture

FIG. 1 illustrates an example architecture 100 for in-browser image perspective manipulation. The architecture 100 includes clients 110 and servers 130 connected over a network 150. Servers 130 may connect and communicate with image database 135, for example over a local intranet. In some aspects of the subject technology, servers 130 may instead connect to image database 135 over network 150. Users 120 may interact with respective clients 110. While user 120A, user 120B, user 120C, and user 120D are shown to be associated with a respective client 110A, client 110B, client 110C, and client 110D, each of users 120 may also be associated with multiple devices or clients 110.

Clients 110 may each execute a respective web browser that retrieves and executes an in-browser image editor that is provided by one of servers 130, which may include web servers. As shown in FIG. 1, a variety of different devices may execute the in-browser image editor, including a desktop or client 110A, a laptop or client 110B, a smartphone or client 110C, and a feature phone or client 110D. Thus, clients 110 may be executing web browsers with differing feature support and underlying device hardware. For example, some clients 110 may include GPU 213, whereas other clients 110 may lack GPU 213.

The in-browser image editor may provide a variety of image editing tools, including a perspective manipulation tool. As discussed above, image compositing often includes perspective correction to create a consistent viewpoint for the viewer. However, true 3D perspective correction can be a computationally intensive task, particularly for larger image sizes. While the highly parallel architecture of a graphics processor unit (GPU) is ideally suited to perform 3D perspective correction, the in-browser image editor cannot assume that every browser or device supports GPU acceleration.

Accordingly, prior to performing a perspective manipulation operation, the in-browser image editor can determine an indicator for supporting hardware graphics acceleration, which may be a Boolean flag that is returned by the web browser in response to a feature support query. If the indicator is true, then a 3D accelerated transformation may be utilized. Otherwise, a fast 2D approximation may be utilized by dividing the image into smaller work units for affine transformations, as described in further detail below.

The clients 110 can be any device having an appropriate processor, memory, and communications capability for executing the in-browser image editor. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities.

One of the many servers 130 is configured to host a web server. For the purposes of load balancing, multiple servers 130 can host the web servers, which may be configured as a content delivery network (CDN). In certain aspects, one or more of the servers 130 can be a cloud computing server of an infrastructure-as-a-service (IaaS), and be able to support a platform-as-a-service (PaaS) and software-as-a-service (SaaS) services.

The web server may provide web content in response to requests from web browsers. The web content may include the in-browser image editor, which may be retrieved from clients 110 and optionally stored locally in a cache. The web server may also provide access to a collection of images stored on image database 135, which may include user generated content provided by users 120, provider generated images such as stock photos, and other images provided by business partners or other entities.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Providing in-Browser Image Perspective Manipulation

Figure 2:
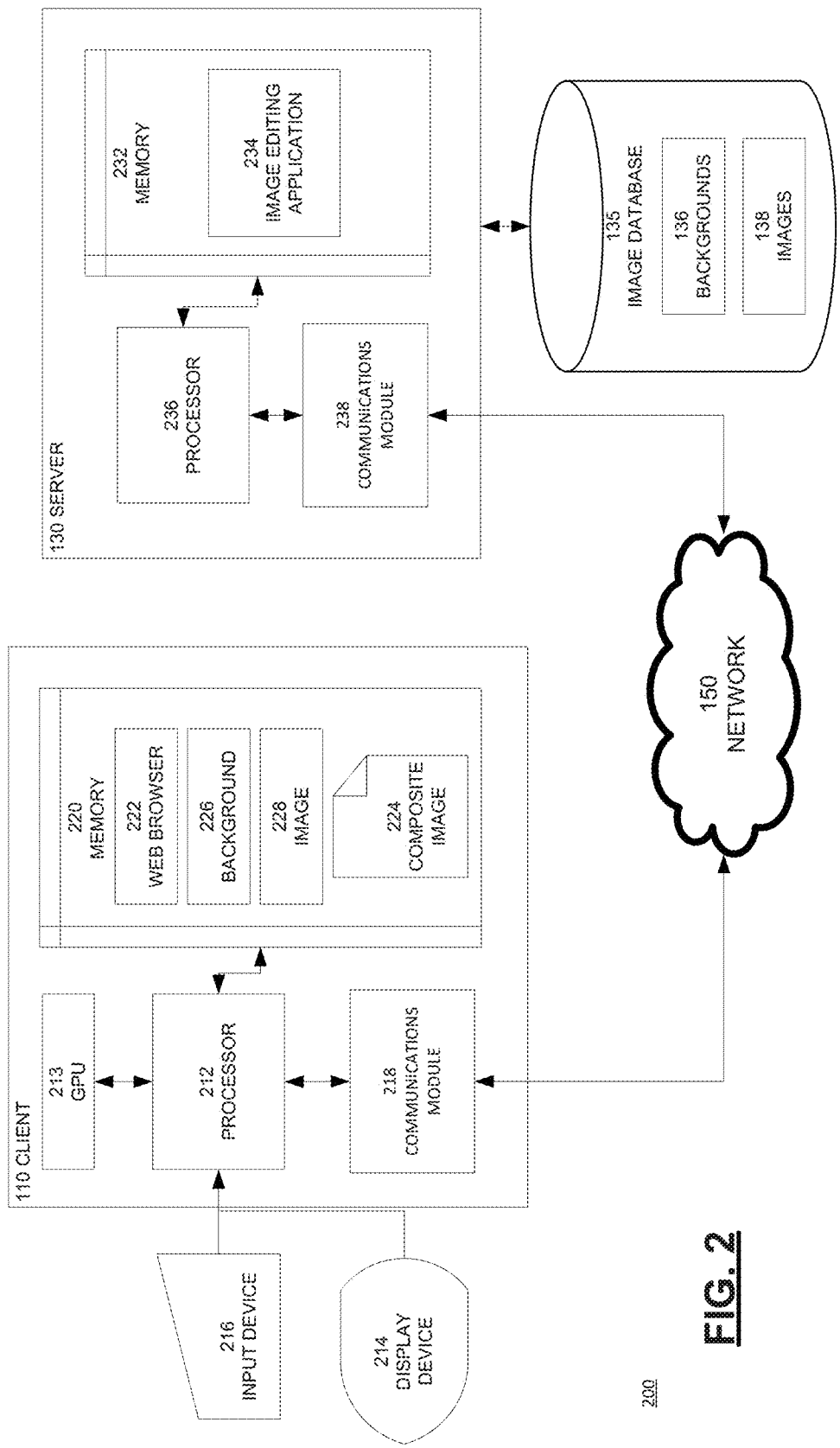
FIG. 2 is a block diagram illustrating an example client and server from the architecture of FIG. 1 according to certain aspects of the disclosure.

FIG. 2 is a block diagram 200 illustrating an example server 130, client 110, and image database 135 from the architecture of FIG. 1 according to certain aspects of the disclosure. The client 110 and server 130 are connected over the network 150 via respective communications modules 218 and 238. The communications modules 218 and 238 are configured to interface with the network 150 and to receive information, such as data, requests, responses, and commands to other devices on the network. The communications modules 218 and 238 can be, for example, modems or Ethernet cards. Server 130 may also communicate with image database 135 using communications module 238, for example, to issue database queries and add database records.

Client 110 includes processor 212, GPU 213, communications module 218, and memory 220. The client 110 also includes an input device 216, such as a keyboard, mouse, touchscreen, or pen digitizer, and a display device 214. The processor 212 of the client 110 is configured to execute instructions, such as instructions physically coded into the processor 212, instructions received from software in memory 220, or a combination of both. For example, the processor 212 of client 110 may execute web browser 222, and a user may direct web browser 222 to access a uniform resource locator (URL) pointing to server 130 to retrieve image editing application 234. Client 110 may download and store image editing application 234 into memory 220, which may include a non-volatile browser cache. Web browser 222 may execute image editing application 234 in memory 220 to provide an in-browser image editor. A user interface for image editing application 234 may be shown in a browser window or in full screen mode on display device 214, and the user may use input device 216 to interact with the user interface.

For example, a user may direct client 110 to download background 226 and image 228 from image database 135, which can be stored in memory 220 as shown. As shown in image database 135, images may be categorized into backgrounds 136 or images 138, and may include provider stock photos as well as user generated content. The distinction between backgrounds 136 and images 138 is somewhat arbitrary as the user could overlay an image from backgrounds 136 onto an image from images 138, but for explanatory purposes it may be assumed that the user overlays images from images 138 onto images from backgrounds 136.

Although not specifically shown in FIG. 2, other users and associated clients may also be in communication with servers 130 over network 150. The other clients may include components similar to those shown in client 110 in FIG. 2.

Server 130 includes processor 236, communications module 238, and memory 232, which includes image editing application 234. The processor 236 of the server 130 is configured to execute instructions, such as instructions physically coded into the processor 236, instructions received from software in memory 232, or a combination of both.

For example, the processor 236 of the server 130 may execute a web server or daemon that responds to Hypertext Transfer Protocol (HTTP) requests with Hypertext Markup Language (HTML) files and other browser interpretable formats. For example, the web server may provide image editing application 234 as a combination of HTML, JavaScript, cascading style sheets (CSS), extensible markup language (XML), and other web technologies including client or server side scripting. Server 130 may also communicate with image database 135 to retrieve and store image data, or alternatively client 110 may directly access image database 135.

Processor 212 of client 110 executes, in web browser 222, image editing application 234 retrieved from server 130. For example, as discussed above, a user may direct web browser 222 to a URL that points to server 130, and a local copy of image editing application 234 may be retrieved and stored in memory 220 and/or a browser cache within non-volatile memory. Web browser 222 may execute the local copy of image editing application 234.

Processor 212 of client 110 provides for display, in a user interface of image editing application 234, background 226 and image 228, wherein image 228 includes a plurality of anchors. For example, the user interface may be shown in a browser window or full screen on display device 214.

Processor 212 of client 110 modifies the plurality of anchors in response to user input. For example, a user may use input device 216 to move one or more of the plurality of anchors to different positions within the user interface. If input device 216 is a mouse, for example, then the user may click and drag to select and move a particular anchor of the plurality of anchors.

Processor 212 of client 110 determines an indicator for supporting hardware graphics acceleration in web browser 222. For example, a feature support query may be sent to web browser 222, and web browser 222 may respond with one or more Boolean indicator flags indicating support for various features including hardware graphics acceleration.

When the indicator is true, processor 212 of client 110 calls a 3D perspective transformation function on image 228 using the modified plurality of anchors to provide a transformed image. The 3D perspective transformation function may be a true 3D transform that leverages the availability of GPU 213 and browser support for 3D accelerated rendering.

When the indicator is false, processor 212 of client 110 performs a 2D approximation of the transformation function. Processor 212 divides image 228 into a plurality of polygons, performs an affine transformation on each of the plurality of polygons based on the modified plurality of anchors, and combines the transformed plurality of polygons to provide the transformed image.

Processor 212 of client 110 composites an output image, or composite image 224, comprising the transformed image in front of background 226. Once the transformed image is obtained, compositing the images is a straightforward Z-layering process. Alpha channel data in image 228 and the corresponding transformed image may be used for transparency.

Processor 212 of client 110 stores the composite image 224 in memory 220. The composite image 224 may also be stored in non-volatile memory and/or uploaded to server 130 for storage into image database 135.

Processor 212 of client 110 provides the composite image 224 for display in the user interface of image editing application 234, which may be displayed on display device 214.

In further aspects of the subject technology, the plurality of anchors includes vertices of a bounding box for image 228. However, alternative aspects of the present technology may include additional vertices at other locations, and a shape other than a box or rectangle may be used for bounding image 228.

In further aspects of the subject technology, the plurality of polygons are triangles. Since most GPUs use triangles as primitives, triangles may be the most efficient polygons for use with GPU 213.

In further aspects of the subject technology, the determining the indicator sets the indicator to false when a size of the image 228 exceeds a predetermined threshold. For example, GPU 213 may have an upper limit for polygon sizes due to limited graphics RAM or other limitations. In this case, the predetermined threshold can be set according to the capabilities of GPU 213, thereby creating a failsafe to the 2D approximation when the size of image 228 exceeds the preset threshold. For example, the predetermined threshold may correspond to an image dimension exceeding 10,000 pixels. Alternatively, in some aspects of the present technology, GPU 213 may be configured to use tiling to handle larger image sizes for image 228.

In further aspects of the subject technology, the modifying the plurality of anchors includes modifying multiple anchors of the plurality of anchors in response to a single input from the user input. For example, the user may lock multiple anchors together such that the anchors move in tandem when only one of the locked anchors is moved. This may be used to enforce aspect ratio or to simultaneously stretch anchors at opposite ends.

In further aspects of the subject technology, the indicator is for WebGL support in the web browser 222, and the user interface for image editing application 234 includes a HTML canvas element.

The techniques described herein may be implemented as method(s) that are performed by physical computing device(s), as one or more non-transitory computer-readable storage media storing instructions which, when executed by computing device(s), cause performance of the method(s), or, as physical computing device(s) that are specially configured with a combination of hardware and software that causes performance of the method(s).

Figure 3:
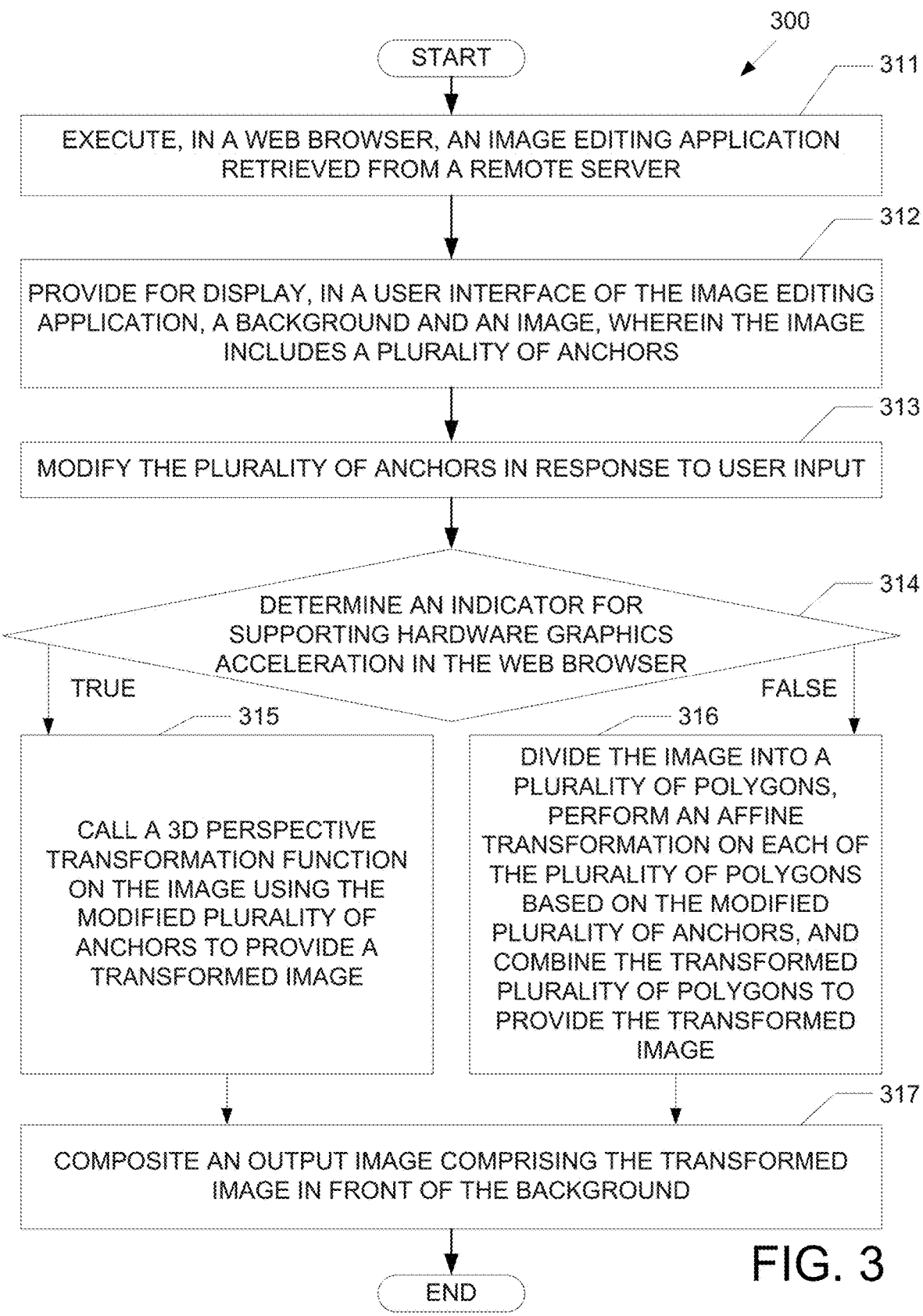
FIG. 3 illustrates an example process for providing in-browser image perspective manipulation using the example client of FIG. 2.

FIG. 3 illustrates an example process 300 for providing in-browser image perspective manipulation using the example client 110 of FIG. 2. While FIG. 3 is described with reference to FIG. 2, it should be noted that the process steps of FIG. 3 may be performed by other systems.

The process 300 begins by proceeding to step 311, where processor 212 executes, in web browser 222, image editing application 234 retrieved from server 130. As discussed above, a local copy of image editing application 234 may be retrieved from server 130 prior to step 311.

In step 312, processor 212 provides for display, in a user interface of image editing application 234, background 226 and image 228, wherein image 228 includes a plurality of anchors. As discussed above, the user interface may be shown in a browser window or full screen on display device 214.

Figure 4A:
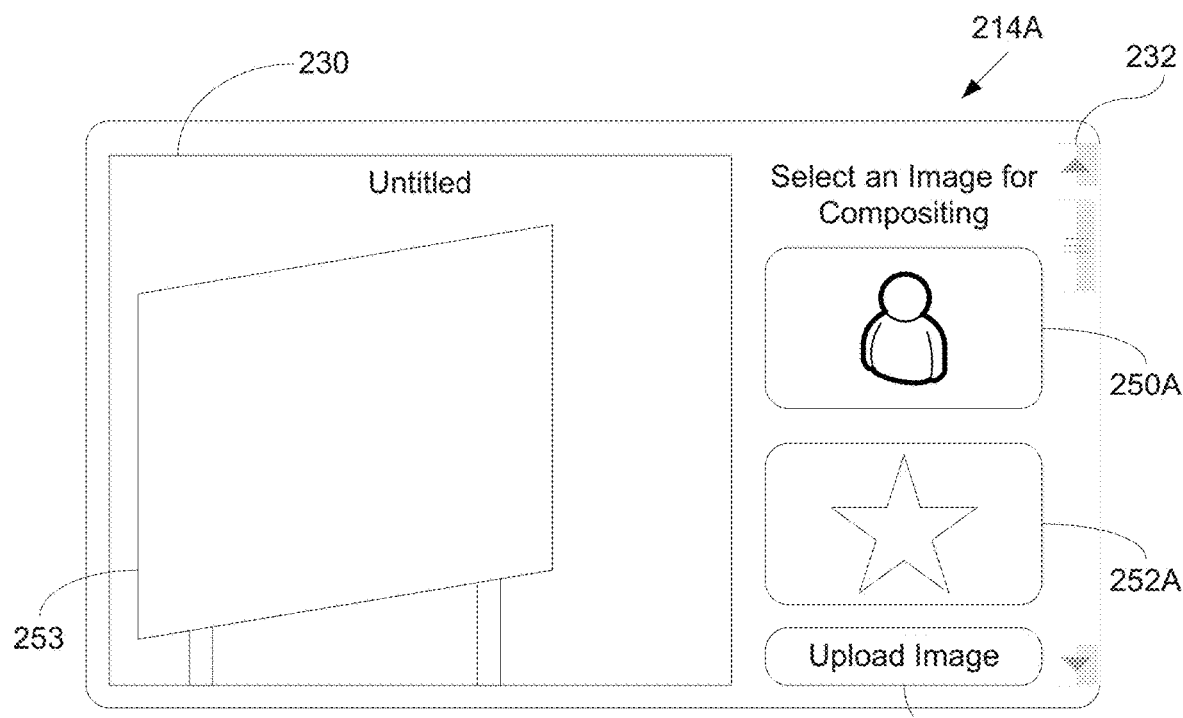
FIG. 4A, FIG. 4B, FIG. 4C and FIG. 4D illustrate example user interfaces for providing in-browser image perspective manipulation.

For example, referring to FIG. 4A, an example user interface is displayed on display device 214A for providing in-browser image perspective manipulation. The user interface includes editor window 230, slider 232, sample image 250A, sample image 252A, and button 231. While a web browser is not specifically shown on display device 214A, it may be assumed that the user interface is displayed in a browser window. Sample images 250A and 252A may be retrieved from images 138, and the user may use slider 232 to browse other sample images from images 138. Alternatively, the user may click on button 231 to upload a user provided image. A similar process may be used to select background 226, which is shown in editor window 230. As shown in FIG. 4A, background 226 may correspond to a picture of a billboard 253.

Figure 4B:
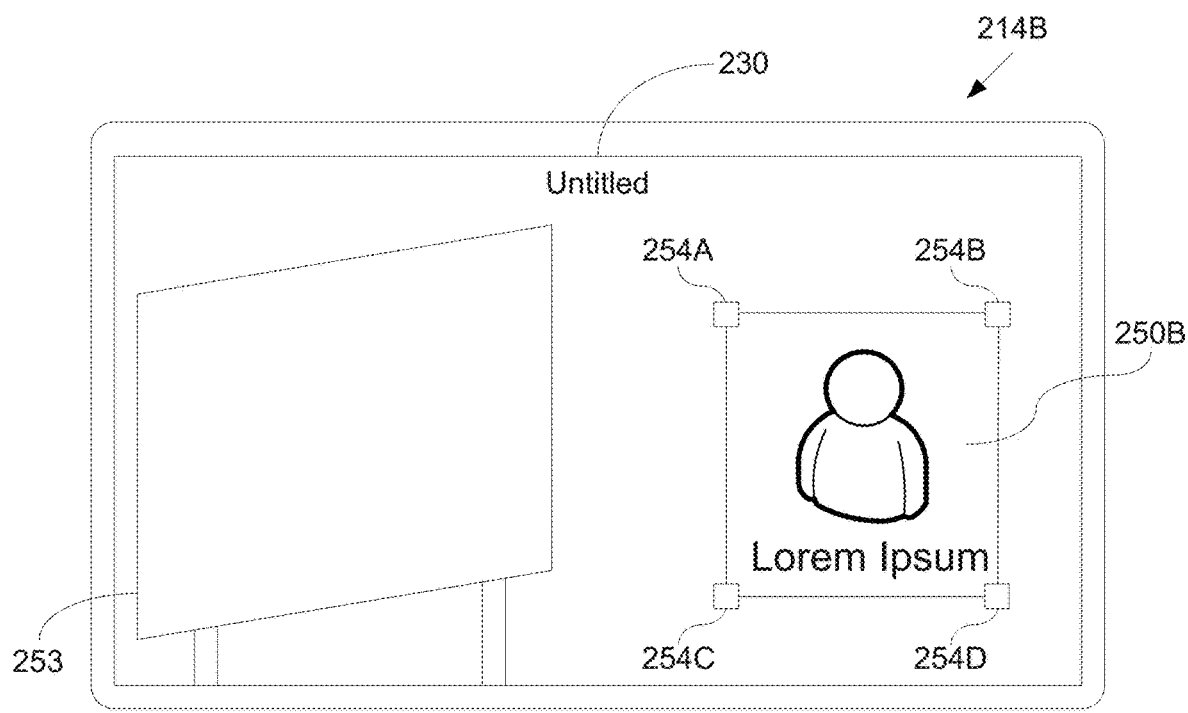

Processor 212 may receive image 228 corresponding to a selected sample image or the uploaded user provided image. For the purposes of process 300, it may be assumed that the user selects sample image 250A as image 228. Display device 214A may then transition to the state of display device 214B shown in FIG. 4B. Image 250B corresponding to image 228 is added into editor window 230. Further, anchor 254A, anchor 254B, anchor 254C, and anchor 254D are included and associated with image 250B. As shown in FIG. 4B, anchors 254A-254D are located at the vertices or corners of a bounding box for image 250B.

Figure 4C:
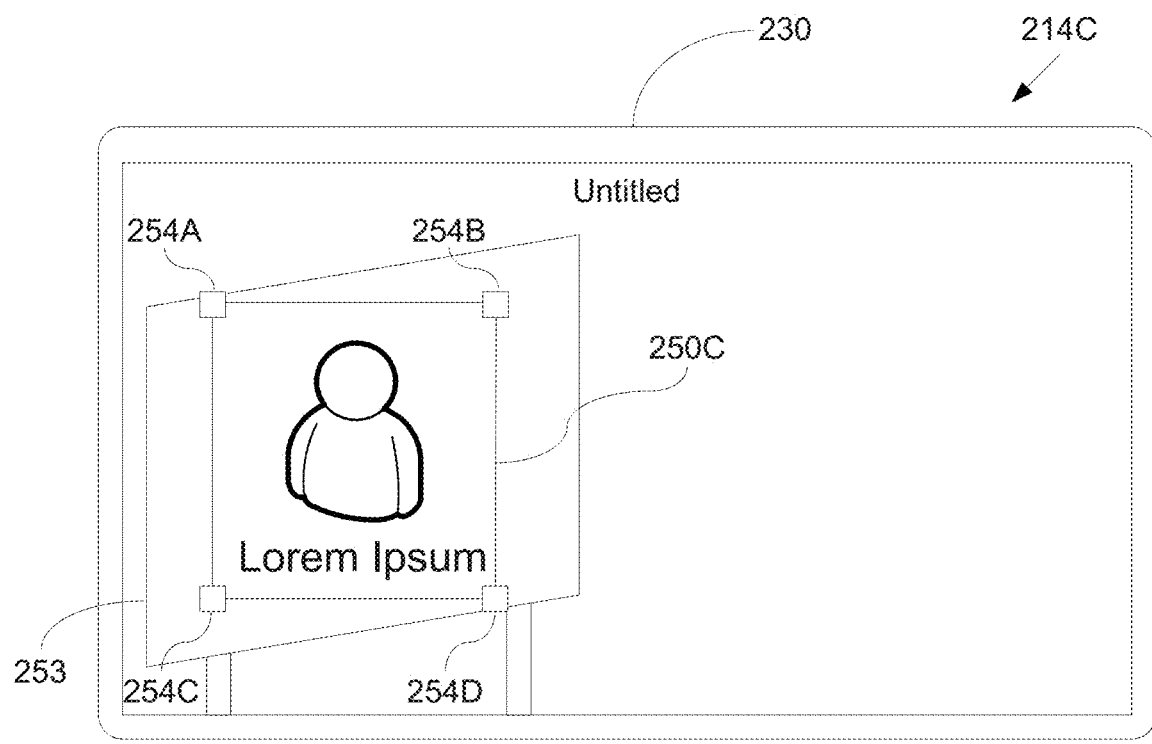

In step 313, processor 212 modifies the plurality of anchors in response to user input. As discussed above, referring to FIG. 2, the user may use input device 216 to move one or more of the plurality of anchors presented in step 312 to different positions within the user interface. For example, referring to FIG. 4B, the user may click and drag on image 250B to reposition image 250B on top of billboard 253. In this case, anchors 254A-254D may automatically lock to each other and move in tandem, resulting in a relocated image 250C as shown in display device 214C of FIG. 4C. However, since image 250C has a head-on perspective whereas billboard 253 has an angled perspective, image 250C appears inconsistent with billboard 253.

Figure 4D:
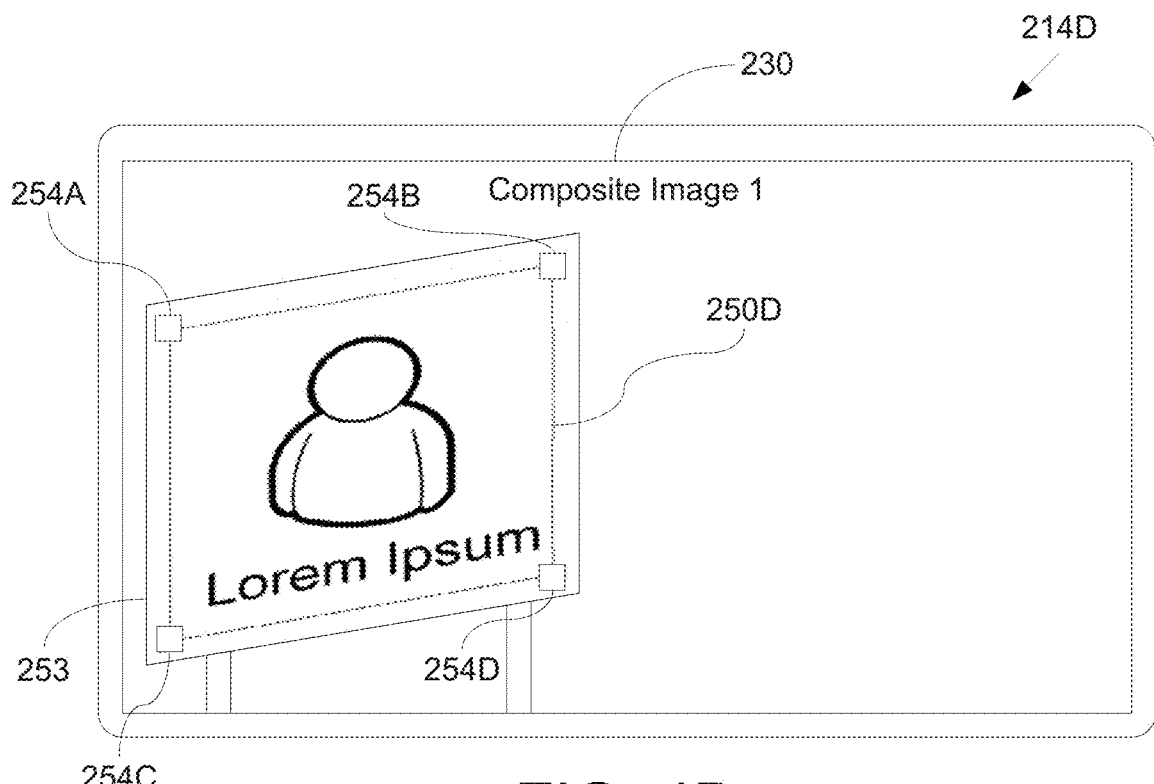

Thus, the user may modify anchors 254A-254D adjust the perspective of image 250C into image 250D, as shown in display device 214D of FIG. 4D. The process of transforming image 250C into image 250D according to the modified anchors 254A-254D is described below in steps 314-316.

In step 314, processor 212 determines an indicator for supporting hardware graphics acceleration in web browser 222. As discussed above, a feature support query may be sent to web browser 222, and a Boolean flag may be returned for the indicator.

When the indicator from step 314 is true, process 300 proceeds to step 315, where processor 212 calls a 3D perspective transformation function on image 228 using the modified plurality of anchors to provide a transformed image. For example, when the indicator is for WebGL support, then a vertex shader may be defined that performs the perspective transformation based on the modified plurality of anchors. When an object corresponding to image 228 is processed through the vertex shader and propagated downstream to a fragment shader or pixel shader, then image 228 is rendered with a modified perspective within the user interface of image editing application 234. Since WebGL can harness the processing capability of GPU 213, step 314 may proceed in an accelerated manner.

When the indicator from step 314 is false, process 300 proceeds to step 316, where processor 212 performs a 2D approximation of the transformation function. Processor 212 divides image 228 into smaller work units or a plurality of polygons, which may be specifically triangles. Image 228 may be divided into approximately equally sized polygons. A total count of the plurality of polygons may be determined based on a size of the image 228. Processor 212 performs an affine transformation on each of the plurality of polygons based on the modified plurality of anchors from step 313. Since affine transformations on relatively small polygons may proceed quickly even with limited processing resources, this approximation can proceed in an accelerated manner. Processor 212 combines the transformed plurality of polygons to provide the transformed image.

In step 317, processor 212 composites an output image, or composite image 224, comprising the transformed image in front of background 226. The transformed image is provided by step 315 or step 316 depending on whether the indicator for hardware graphics acceleration in step 314 is true or false. As discussed above, the compositing may use a Z-layering process with alpha channel data in image 228 for transparency. Referring to FIG. 4D and FIG. 2, the composite image 224 may be shown in editor window 230, where the image 250D is overlaid on top of billboard 253 from background 226. If image 250D includes an alpha channel for transparency, any transparent sections of image 250D may show a background texture of billboard 253. Further, as shown in editor window 230, the user may save the composite image 224 for storage into a non-volatile memory, as indicated by the title of editor window 230 changing from "Untitled" to "Composite Image 1." Optionally, the user may also upload composite image 224 to server 130 for storage in image database 135.

Hardware Overview

Figure 5:
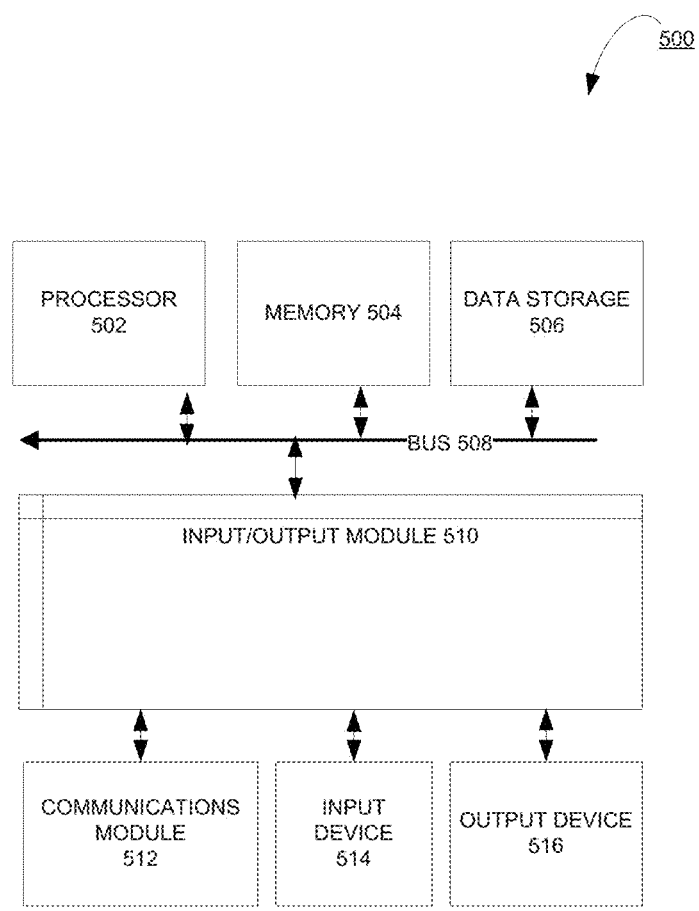
FIG. 5 is a block diagram illustrating an example computer system with which the clients and servers of FIG. 2 can be implemented.

FIG. 5 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110A, client 110B, client 110C, client 110D, and server 130) includes a bus 508 or other communication mechanism for communicating information, and a processor 502 (e.g., processor 212, 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220, 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In-Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi-paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., input device 216, display device 214). The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, wired communication in some implementations, or wireless communication in other implementations, and multiple interfaces may also be used. The input/output module 510 is configured to connect to a communications module 512. Example communications modules 512 (e.g., communications module 218, 238) include networking interface cards, such as Ethernet cards and modems.

The components of the system can be interconnected by any form or medium of digital data communication (e.g., a communication network). The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic, or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link, and communications module 512. In the Internet example, a server might transmit a requested code for an application program through the Internet, the ISP, the local network, and communications module 512. The received code may be executed by processor 502 as it is received, and/or stored in data storage 506 for later execution.

In certain aspects, the input/output module 510 is configured to connect to a plurality of devices, such as an input device 514 (e.g., input device 216) and/or an output device 516 (e.g., display device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 516 include display devices, such as an LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the client 110A can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for providing in-browser image perspective manipulation with faster computational time, the method comprising:
   executing, in a web browser, an image editing application retrieved from a remote server;
   providing for display, in a user interface of the image editing application, a background and an image, wherein the image includes a plurality of anchors comprising vertices of a bounding box for the image;
   modifying the plurality of anchors in response to user input, the modified plurality of anchors adjusting the bounding box to correlate with the background;
   determining an indicator for supporting hardware graphics acceleration in the web browser;
   when the indicator is true, transforming a perspective of the image based on the modified plurality of anchors to provide a transformed image;
   when the indicator is false, divide the image into a plurality of polygons, perform an affine transformation on each of the plurality of polygons based on the adjusted bounding box defined by the modified plurality of anchors, and combine the transformed plurality of polygons to provide the transformed image; and compositing an output image comprising the transformed image in front of the background.

2. The method of claim 1, further comprising:
providing for display, in the user interface, the output image.

3. The method of claim 1, further comprising:
storing the output image in a memory.

4. The method of claim 1, wherein the plurality of polygons are triangles.

5. The method of claim 1, wherein the dividing the image into the plurality of polygons comprises:
determining a count of the plurality of polygons based on a size of the image.

6. The method of claim 1, wherein the determining the indicator sets the indicator to false when a size of the image exceeds a predetermined threshold.

7. The method of claim 1, wherein the modifying the plurality of anchors includes modifying multiple anchors of the plurality of anchors in response to a single input from the user input.

8. The method of claim 1, wherein the indicator is for WebGL support in the web browser.

9. The method of claim 1, wherein the user interface comprises a HTML canvas element.

10. The method of claim 1, further comprising:
receiving the background as selected from a plurality of backgrounds; and
receiving the image as selected from a plurality of images.

11. The method of claim 1, further comprising:
receiving the background from a user provided background.

12. The method of claim 1, further comprising:
receiving the image from a user provided image.

13. A system for providing in-browser image perspective manipulation with faster computational time, the system comprising:
a memory; and
a processor configured to execute instructions which, when executed, cause the processor to:
execute, in a web browser, an image editing application retrieved from a remote server;
provide for display, in a user interface of the image editing application, a background and an image, wherein the image includes a plurality of anchors comprising vertices of a bounding box for the image;
modify the plurality of anchors in response to user input, the modified plurality of anchors adjusting the bounding box to correlate with the background;
determine an indicator for supporting hardware graphics acceleration in the web browser;
when the indicator is true, transforming a perspective of the image based on the modified plurality of anchors to provide a transformed image;
when the indicator is false, divide the image into a plurality of polygons, perform an affine transformation on each of the plurality of polygons based on the adjusted bounding box defined by the modified plurality of anchors, and combine the transformed plurality of polygons to provide the transformed image;
composite an output image comprising the transformed image in front of the background;
store the output image in the memory; and
provide for display, in the user interface, the output image.

14. The system of claim 13, wherein the plurality of polygons are triangles.

15. The system of claim 13, wherein the processor is configured to determine the indicator by setting the indicator to false when a size of the image exceeds a predetermined threshold.

16. The system of claim 13, wherein the processor is configured to modify multiple anchors of the plurality of anchors in response to a single input from the user input.

17. The system of claim 13, wherein the indicator is for WebGL support in the web browser, and wherein the user interface comprises a HTML canvas element.

18. A non-transitory machine-readable storage medium comprising machine-readable instructions for causing a processor to execute a method for providing in-browser image perspective manipulation with faster computational time, comprising:
executing, in a web browser, an image editing application retrieved from a remote server,
providing for display, in a user interface of the image editing application, a background and an image, wherein the image includes a plurality of anchors comprising vertices of a bounding box for the image;
modifying the plurality of anchors in response to user input, the modified plurality of anchors adjusting the bounding box to correlate with the background;
determining an indicator for supporting hardware graphics acceleration in the web browser;
when the indicator is true, transforming a perspective of the image based on the modified plurality of anchors to provide a transformed image;
when the indicator is false, divide the image into a plurality of triangles, perform an affine transformation on each of the plurality of triangles based on the adjusted bounding box defined by the modified plurality of anchors, and combine the transformed plurality of triangles to provide the transformed image;
compositing an output image comprising the transformed image in front of the background;
storing the output image in a memory; and
providing for display, in the user interface, the output image.

* * * * *